US011336876B2

United States Patent
Hsiao

(10) Patent No.: US 11,336,876 B2
(45) Date of Patent: May 17, 2022

(54) PROJECTION SYSTEM AND IMAGE UNIFORMITY COMPENSATION METHOD THEREOF

(71) Applicant: Coretronic Corporation, Hsin-Chu (TW)

(72) Inventor: Pei-Chi Hsiao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 67 days.

(21) Appl. No.: 16/933,896

(22) Filed: Jul. 20, 2020

(65) Prior Publication Data
US 2021/0029332 A1 Jan. 28, 2021

(30) Foreign Application Priority Data
Jul. 22, 2019 (CN) .......................... 201910660318.5

(51) Int. Cl.
*H04N 9/31* (2006.01)
*G09G 3/00* (2006.01)
*G03B 21/14* (2006.01)

(52) U.S. Cl.
CPC ......... *H04N 9/3182* (2013.01); *G03B 21/147* (2013.01); *G09G 3/002* (2013.01);
(Continued)

(58) Field of Classification Search
CPC ........ G03B 21/14; G03B 21/147; H04N 9/31; H04N 9/3182; H04N 9/3194;
(Continued)

(56) References Cited

U.S. PATENT DOCUMENTS 8,610,778 B2 * 12/2013 Krogstad ................. H04N 5/74
348/189
10,044,995 B2 * 8/2018 Guo ...................... H04N 9/3111
(Continued)

FOREIGN PATENT DOCUMENTS

CN 101136192 3/2008
CN 102025952 7/2012
(Continued)

OTHER PUBLICATIONS

"Search Report of Europe Counterpart Application", dated Jan. 13, 2021, p. 1-p. 9.
T. Chauhan, et al., "Chromatic and luminance sensitivity for skin and skinlike textures", Journal of Vision, vol. 19, Issue 1, Jan. 2019, pp. 1-18.
A. Pagani, et al., "Spatially uniform colors for projectors and tiled displays", Journal of The Society for Information Display, Sep. 2007, pp. 679-689.
(Continued)

*Primary Examiner* — William C. Dowling
(74) *Attorney, Agent, or Firm* — JCIPRNET

(57) ABSTRACT

A projection system and an image uniformity compensation method thereof are provided. The method includes the following steps. A test image is projected onto a projection surface by a projection device. When the test image is projected, a plurality of color measurement devices is used to perform measurement on the projection surface to acquire a plurality of test color data corresponding to a plurality of measurement positions respectively. An estimated image is established by using the plurality of test color data. Uniformity compensation information of each pixel is updated according to a target value and each piece of pixel information of the estimated image. An initial image is compensated according to the uniformity compensation information
(Continued)

to generate a uniformized image, which is then projected by the projection device.

20 Claims, 6 Drawing Sheets

(52) U.S. Cl.
CPC ............... *H04N 9/3194* (2013.01); *G09G 2320/0233* (2013.01); *G09G 2320/0693* (2013.01)

(58) Field of Classification Search
CPC .... H04N 9/3158; H04N 9/3179; G09G 3/002; G09G 2320/693; G09G 2320/0244
USPC .......................................................... 353/69
See application file for complete search history.

(56) References Cited

U.S. PATENT DOCUMENTS

| | | | |
|---|---|---|---|
| 10,574,952 B2* | 2/2020 | Fukui | H04N 9/3194 |
| 10,638,104 B2* | 4/2020 | Morris | G01B 11/2513 |
| 2007/0258056 A1 | 11/2007 | Noji | |
| 2008/0062164 A1* | 3/2008 | Bassi | H04N 9/3194 |
| | | | 345/214 |
| 2009/0091623 A1* | 4/2009 | Krogstad | H04N 9/3185 |
| | | | 348/189 |
| 2012/0320042 A1 | 12/2012 | Green et al. | |
| 2014/0043310 A1* | 2/2014 | Pan | G09G 5/10 |
| | | | 345/207 |

FOREIGN PATENT DOCUMENTS

| | | |
|---|---|---|
| CN | 105611259 | 12/2017 |
| CN | 108234975 | 6/2018 |

OTHER PUBLICATIONS

B. Sajadi, et al., "Color Seamlessness in Multi-Projector Displays Using Constrained Gamut Morphing" IEEE Transactions on Visualization and Computer Graphics, vol. 15, No. 6, Oct. 23, 2009, pp. 1-9.

F. L. Bookstein, "Principal Warps: Thin-Plate Splines and the Decomposition of Deformations," IEEE Transactions on Pattern Analysis and Machine Intelligence, vol. 11, Jun. 6, 1989, pp. 567-585.

Bruce Justin Lindbloom, "RGB/XYZ Matrices", retrieved on Jul. 15, 2020, Available at: http://brucelindbloom.com/index.html?Eqn_RGB_XYZ_Matrix.html.

"Office Action of China Counterpart Application", dated Oct. 8, 2021, p. 1-p. 6.

* cited by examiner

PROJECTION SYSTEM AND IMAGE UNIFORMITY COMPENSATION METHOD THEREOF

CROSS-REFERENCE TO RELATED APPLICATION

This application claims the priority benefit of China application serial no. 201910660318.5, filed on Jul. 22, 2019. The entirety of the above-mentioned patent application is hereby incorporated by reference herein and made a part of this specification.

BACKGROUND OF THE DISCLOSURE

1. Field of the Disclosure

The present disclosure relates to a projection technology, and in particular, to a projection system and an image uniformity compensation method thereof.

2. Description of Related Art

A projection device is a display device that can be used to produce a large-sized image. When the projection device projects an image, an illumination beam generated by a light source is projected onto a light valve by light splitting and shaping. For example, an illumination system of the projection device may use a lens array or a light integration rod to allow the illumination beam to be uniformly emitted to the light valve. Then, the light valve may convert the illumination beam into an image beam by reflection or transmission and provide the image beam to a projection lens, which in turn projects the image beam onto a projection surface (e.g., a screen or a wall) for imaging. It can be seen that a beam needs to be projected completely via a reflection and refraction path, which will result in a phenomenon of non-uniform luminance or chrominance of a projected image finally imaged on the projection surface. The most common image non-uniformity is that a central area of the projected image is brighter but a peripheral area of the projected image is darker, or the color representation of the peripheral area of the projected image is different from the color representation of the central area.

In general, the phenomenon of non-uniform luminance or chrominance of the projected image may be caused by the length of a path through which the beam passes from the light source to the projection surface, the aging of internal uniform components of the illumination beam, or other factors. In addition, projected images projected by different projection devices may also have a phenomenon of luminance or chrominance drop. Thus, when a plurality of projection devices performs projection splicing, spliced parts of the projected images may obviously display the luminance or chrominance drop. That is to say, a spliced image generated by the projection splicing of the plurality of projection devices may also have the phenomenon of non-uniform luminance or chrominance.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY OF THE DISCLOSURE

In view of this, the present disclosure provides a projection system and an image uniformity compensation method thereof, which can improve the phenomenon of non-uniform chrominance or non-uniform luminance of a projected image.

The present disclosure provides an image uniformity compensation method, which is suitable for a projection system including a projection device and includes the following steps. A test image is projected onto a projection surface by a projection device. When the test image is projected, a plurality of color measurement devices is used to perform measurement on the projection surface to acquire a plurality of test color data corresponding to a plurality of measurement positions respectively. An estimated image is established by using the plurality of test color data. Uniformity compensation information of each pixel is updated according to a target value and each piece of pixel information of the estimated image. An initial image is compensated according to the uniformity compensation information to generate a uniformized image, which is then projected by the projection device.

The present disclosure provides a projection system, which includes a projection device, a plurality of color measurement devices, and a computing device. The projection device projects a test image onto a projection surface. The plurality of color measurement devices is provided on the projection surface, and the computing device connects the projection device and the plurality of color measurement devices. When the projection device projects the test image, the plurality of color measurement devices performs measurement on the projection surface, and the computing device acquires a plurality of test color data corresponding to a plurality of measurement positions respectively. The computing device establishes an estimated image by using the plurality of test color data, and updates uniformity compensation information of each pixel according to a target value and each piece of pixel information of the estimated image. The computing device compensates an initial image according to the uniformity compensation information to generate a uniformized image, which is then projected by the projection device.

Based on the above, in the embodiments of the present disclosure, an actual projection result is measured on a projection surface by using a plurality of color measurement devices, and an entire estimated image may be established according to a measurement result. Then, uniformity compensation information corresponding to each pixel position is generated according to each piece of pixel information of the estimated image and a target value, where the target value is also determined according to the measurement result. Therefore, in the embodiments of the present disclosure, projection may be performed after an initial image is adjusted by using the uniformity compensation information, so that the luminance and chrominance of a image presented on the projection surface are uniform.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The foregoing and other technical content, characteristics and efficiency of the present disclosure are clearly presented in the detailed description of the one of the preferred embodiments with reference to the accompanying drawings. In addition, the directional terms mentioned herein, like "above", "below", "left", "right", "front", and "back", refer to the directions in the appended drawings. Therefore, the directional terms are only used for illustration instead of limiting the present disclosure.

Figure 1:
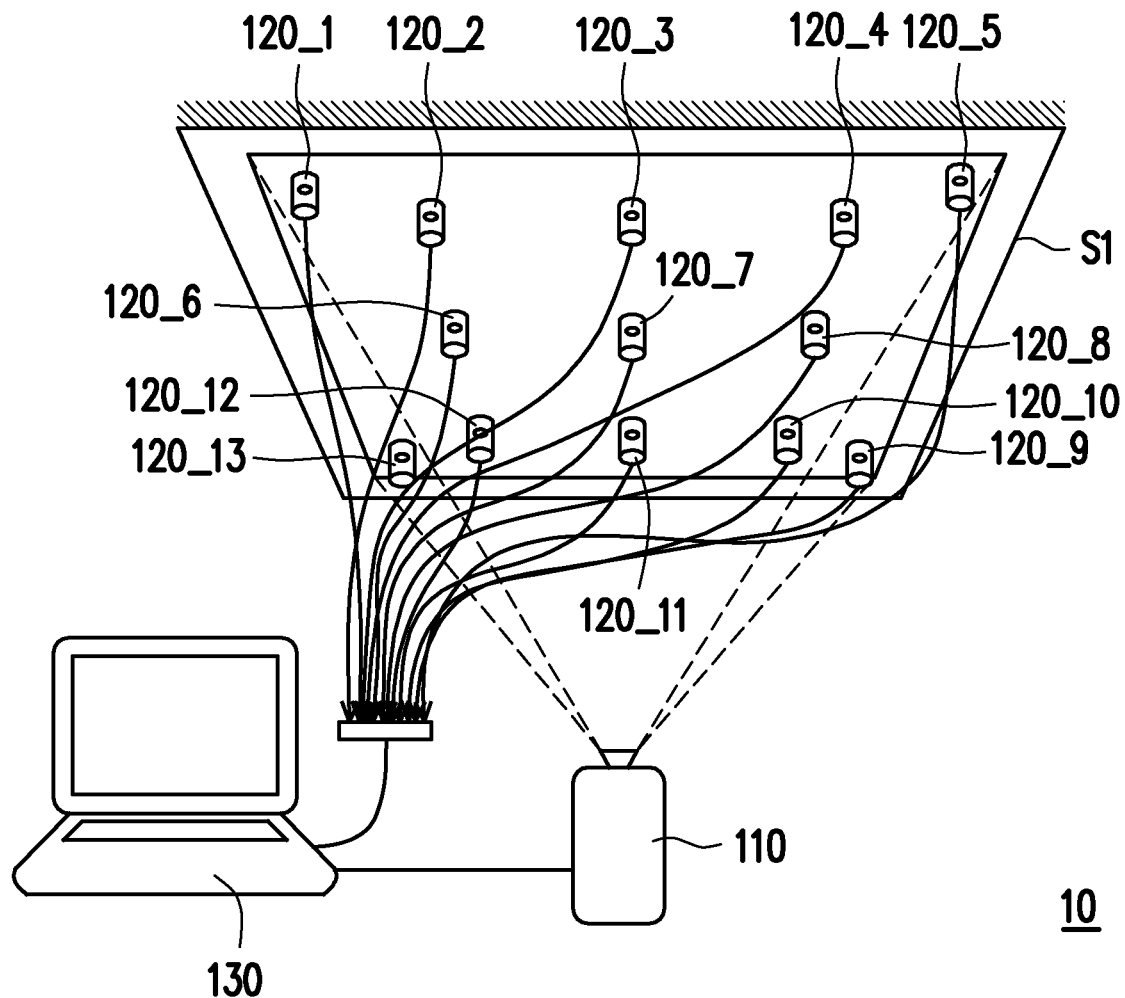
FIG. 1 is a schematic diagram of a projection system according to an embodiment of the present disclosure.

FIG. 1 is a schematic diagram of a projection system according to an embodiment of the present disclosure. Referring to FIG. 1, a projection system 10 includes a projection device 110, a plurality of color measurement devices 120_1-120_13, and a computing device 130.

The projection device 110 may project an image provided by the computing device 130 onto a projection surface S1. The projection device may be a liquid crystal projector (LCP), a digital light processing (DLP) projector, or a liquid crystal on silicon (LCOS) projection display device, etc. In the present embodiment, the projection device 110 may further include a light source module, a light machine module, a lens module, and related optical and circuit control elements, etc. The projection surface S1 may be a flat plane or a curved surface, such as a wall surface, a flat screen or a spherical screen, etc., which is not limited by the present disclosure.

The color measurement devices 120_1-120_13 may be attached to a plurality of measurement positions on the projection surface S1, and are, for example, instruments such as a chrominance illuminometer or a spectrometer that can be used to measure color information. In general, the color measurement devices 120_1-120_13 may be attached to the projection surface S1 and perform measurement toward the projection device 110. After the measurement, chrominance coordinates are output. The chrominance coordinates may be CIE 1931 chrominance coordinates, CIE 1976 chrominance coordinates, CIE RGB chrominance coordinates, etc., which are not limited by the present disclosure.

It is to be noted that FIG. 1 is an illustration of 13 color measurement devices 120_1-120_13, but the present disclosure does not limit the number of color measurement devices. The number of color measurement devices may be 5, 9, etc. However, in order to establish an estimated image according to a measurement result generated by a color measurement device, the number of color measurement devices is preferably at least 1. In addition, the present disclosure does not limit a measurement position of the color measuring device, which may be designed according to actual needs.

The computing device 130 connects the projection device 110 and the plurality of color measurement devices 120_1-120_13, and includes at least a memory and at least one processor coupled to the memory. The computing device 130 may be a computer control system with a computing power such as a desktop computer, a notebook computer, a work station, an industrial computer, or a server host. The memory may be any type of non-transitory, volatile or non-volatile data storage device for storing buffered data, permanent data, and compiling program codes for performing the functions of the computing device 130. The processor may be a field programmable array (FPGA), a programmable logic device (PLD), an application specific integrated circuit (ASIC), or other similar devices, or a combination of the devices. The processor may be a central processing unit (CPU), or other programmable general-purpose or special-purpose microprocessors, digital signal processors (DSP), graphics processing units (GPU), other similar devices, or a combination of the devices.

Figure 2:
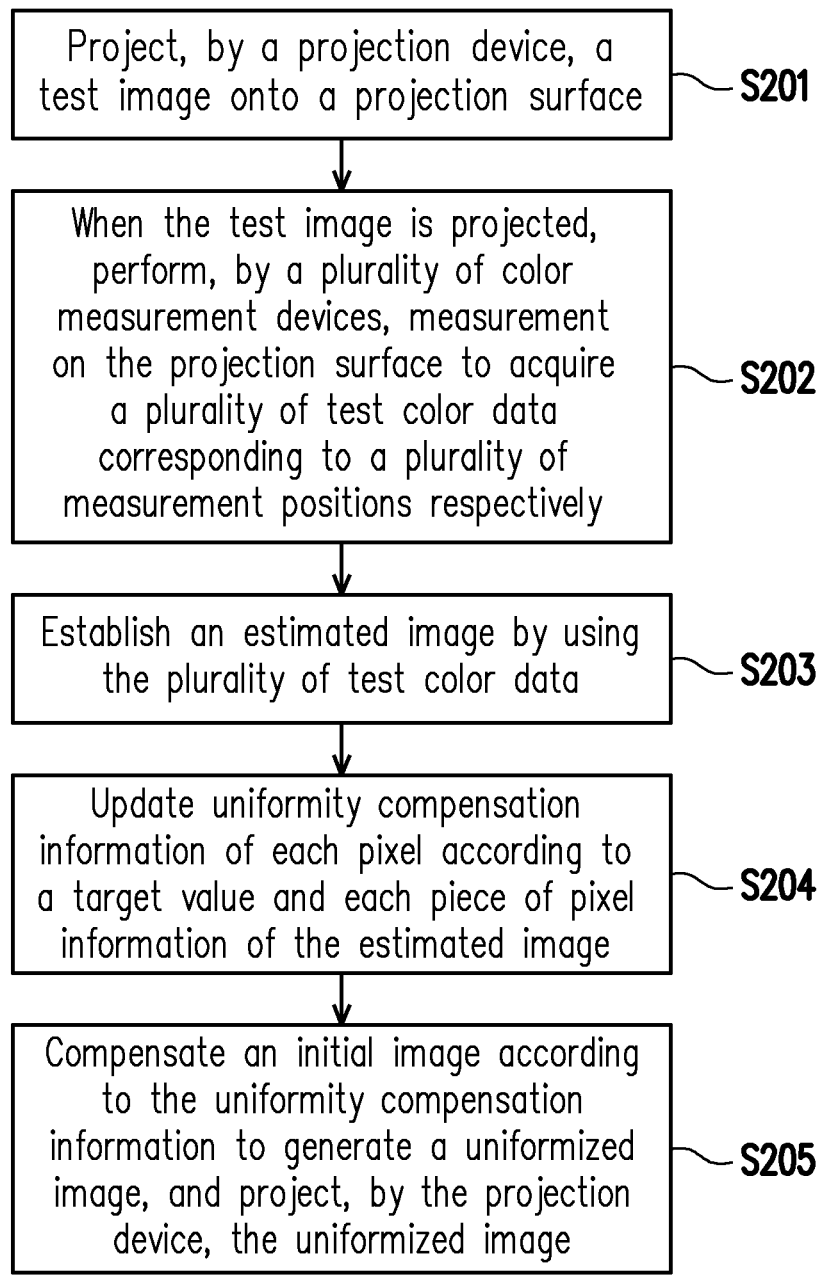
FIG. 2 is a flow chart of an image uniformity compensation method according to an embodiment of the present disclosure.

FIG. 2 is a flow chart of an image uniformity compensation method according to an embodiment of the present disclosure. The method flow of FIG. 2 may be implemented by various components of the projection system 10 of FIG. 1. Referring to FIG. 1 and FIG. 2 simultaneously, the steps of the image uniformity compensation method of the present embodiment will be described below with reference to the various components of the projection system 10 of FIG. 1.

At step S201, a test image (not shown) is projected onto a projection surface S1 by the projection device 110. Specifically, the computing device 130 provides a test image to the projection device 110, and the projection device 110 projects the test image onto the projection surface S1.

At step S202, when the projection device 110 projects the test image, the plurality of color measurement devices 120_1-120_13 is used to perform measurement on the projection surface S1, and the computing device 130 acquires a plurality of test color data corresponding to a plurality of measurement positions respectively. In general, the color measurement devices 120_1-120_13 are preferably dispersed over the entire projection surface S1. As shown in FIG. 1, the color measurement devices 120_1, 120_5, 120_9, and 120_13 are provided on four corners of the projection surface S1, and the color measurement devices 120_2-120_4, 120_6-120_8, and 120_10-120_12 are provided on the projection surface S1 in the type of a Chinese character "Tian". Therefore, the color measurement devices 120_1-120_13 may perform color measurement at different measurement positions on the projection surface S1, and output test color data respectively corresponding to the measurement positions to the computing device 130. The test color data is chrominance coordinates corresponding to a specific color space.

At step S203, the computing device 130 establishes an estimated image by using the plurality of test color data. Further, the test color data may be regarded as sampling data for sampling different pixels of the projected image. The computing device 130 may estimate an estimated image according to a projected image size (i.e., a projected image resolution) and test color data associated with different measurement positions. In an embodiment, the computing device 130 may generate the estimated image by linear interpolation or nonlinear interpolation. FIG. 1 is taken as an example. If the projected image resolution is M*N, the computing device 130 may establish an estimated image having an image size of M*N by using 13 test color data (i.e., 13 pieces of pixel information) from the color measurement devices 120_1-120_13. In more detail, the computing device 130 may perform interpolation processing for respective color space components to acquire respective pixel value components of each pixel on the estimated image to establish an estimated image having M*N pixels.

At step S204, the computing device 130 updates uniformity compensation information of each pixel according to a target value and each piece of pixel information of the estimated image. The uniformity compensation information of each pixel is a compensation gain value, which may be between 0 and 1. Specifically, an initial preset value of the uniformity compensation information of each pixel may be preset to, for example, '1'. The computing device 130 may compare the respective color space components of each pixel on the estimated image with the target value to determine how to update the uniformity compensation information from the preset value to other values. That is to say, assuming that the projected image resolution is M*N, the computing device 130 will update 3*M*N compensation gain values corresponding to three color space components of M*N pixels respectively. That is, three color space components (e.g., red, green, and blue) of each pixel on the estimated image have respective corresponding compensation gain values.

Then, at step S205, the projection device 110 compensates an initial image according to the uniformity compensation information to generate a uniformized image, which is then projected by the projection device 110. That is to say, assuming that the projected image resolution is M*N, the projection device 110 may use the 3*M*N compensation gain values to respectively adjust the respective color space components of the M*N pixels on the initial image to acquire the uniformized image. In more detail, the projection device may multiply the 3*M*N compensation gain values by the corresponding color space components of the corresponding pixels on the initial image. In other words, in the embodiments of the present disclosure, the three color space components of each pixel on the initial image are attenuated to different degrees, so that the projected image generated by the projection device 110 according to the uniformized image is uniform in both luminance and chrominance. It is to be noted that the uniformity compensation information generated based on steps S201 to S204 may be recorded in a processing circuit of the projection device 110, such that the projection device 110 may compensate, after executing a correction program, an initial image from the computing device 130 or other image source devices to project a uniformized image. Therefore, a projection result generated by the projection device 110 according to the uniformized image does not have the phenomenon of non-uniform luminance or chrominance.

In an embodiment, the computing device 130 determines the uniformity compensation information by comparing the target value with each piece of pixel information on the estimated image. The target value is determined according to an actual projection image that has not been compensated and corrected. In addition, in an embodiment, the computing device 130 may also generate, by iterative computation, uniformity compensation information that can more accurately compensate image uniformity. An embodiment will be enumerated below to describe in detail how to generate the uniformity compensation information.

Figure 3:
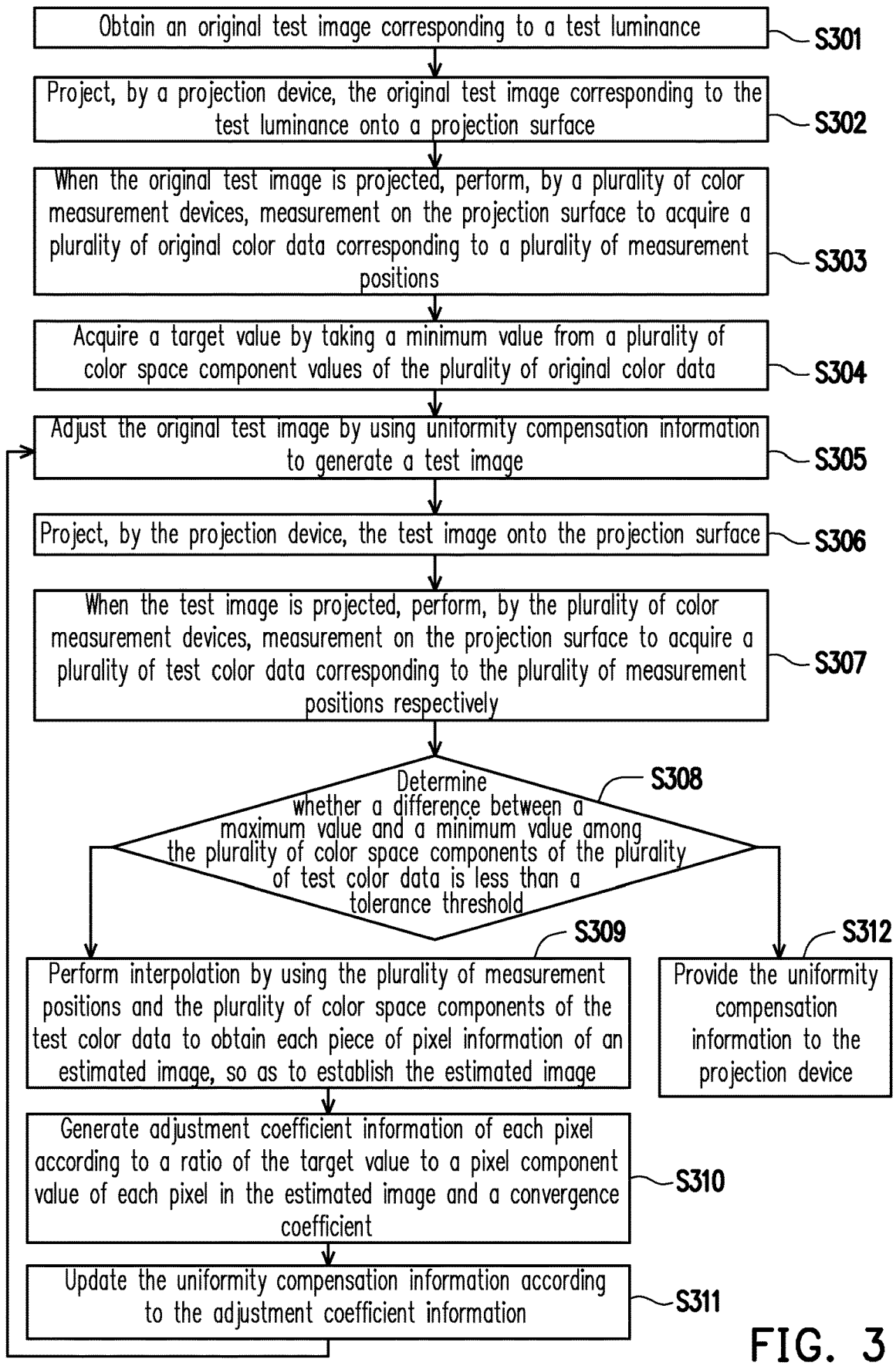
FIG. 3 is a flow chart of determining uniformity compensation information according to an embodiment of the present disclosure.

FIG. 3 is a flow chart of an image uniformity compensation method according to an embodiment of the present disclosure. The method flow of FIG. 3 may be implemented by various components of the projection system 10 of FIG. 1. Referring to FIG. 1 and FIG. 3 simultaneously, the step of generating the uniformity compensation information in the present embodiment will be described below with reference to the various components of the projection system 10 in FIG. 1. It is to be noted that the following is an illustration in which the projected image resolution of the projected image is M*N.

It is to be noted that in the embodiments of the present disclosure, the computing device 130 may generate corresponding uniformity compensation information for different test luminances. The test luminance may be 100%, 75%, 50%, 25% or 0%, etc., and may be designed according to actual needs. When corresponding uniformity compensation information is generated for a certain test luminance, the computing device 130 provides an original test image corresponding to the certain test luminance to the projection device 110 for projection to generate uniformity compensation information corresponding to the certain test luminance.

First, at step S301, the computing device 130 obtains an original test image corresponding to a test luminance. At step S302, the projection device 110 projects the original test image corresponding to the test luminance onto a projection surface S1. Specifically, the computing device 130 may provide an original test image (i.e., a white image, a black image, or a gray image corresponding to the test luminance) having the same pixel information and corresponding to the test luminance to the projection device 110, so that the projection device 110 may project the original test image onto the projection surface S1. For example, when the test luminance is 100%, R, G, and B values of each pixel on the original test image are all 256 (1 after normalization). When the test luminance is 50%, R, G, and B values of each pixel on the original test image are all 128 (0.5 after normalization).

At step S303, when the projection device 110 projects the original test image, the plurality of color measurement devices 120_1-120_13 is used to perform measurement on the projection surface S1, and the computing device 130 acquires a plurality of original color data corresponding to a plurality of measurement positions respectively. The original color data is chrominance coordinates. Although pixel values of the respective pixels on the original test image are the same, the measurement results of the color measurement devices 120_1-120_13 at different measurement positions on the projection surface S1 may be different based on the factors such as the difference in length of a light transmission path or the aging of projection optical elements.

In addition, in an embodiment, the color measurement devices 120_1-120_13 may output a plurality of color measurement values corresponding to a first color space after the measurement, such as an X value, a Y value, and a Z value of a CIE 1931 color space. Since the computing device 130 and the projection device 110 perform a projection operation in a CIE RGB color space, the computing device 130 converts, based on a color conversion matrix, the plurality of color measurement values measured by the plurality of color measurement devices 120_1-120_13 and corresponding to the first color space into the plurality of test color data corresponding to a second color space. That is, the computing device 130 may convert color measurement values $(X_i, Y_i, Z_i)_{i=1-13}$ output by the color measurement devices 120_1-120_13 into original color data $(R_i, G_i, B_i)_{i=1-13}$, where i is an index value of a measurement position.

It is to be noted that the above description is based on an example where the first color space is the CIE 1931 color space and the second color space is the CIE RGB color space. However, the present disclosure does not limit the first color space and the second color space, which may be designed according to actual needs. In addition, the definitions of white light are different under different ambient light sources. Therefore, in the embodiments of the present disclosure, the color conversion matrix for converting the color measurement values of the first color space into the plurality of original color data of the second color space may also be designed according to different light source color temperatures, and the present disclosure is not limited thereto. However, in order to facilitate the description of the present disclosure, the following description will continue with the example where the first color space is the CIE 1931 color space and the second color space is the CIE RGB color space. That is, the measurement values output by the color measurement devices 120_1-120_13 are CIE 1931 chrominance coordinates, and the computing device 130 converts the CIE 1931 chrominance coordinates output by the color measurement devices 120_1-120_13 into CIE RGB chrominance coordinates and then performs the subsequent flow.

At step S304, the computing device 130 acquires a target value by taking a minimum value from a plurality of color space component values of the plurality of original color data. In the present embodiment, the computing device 130 may obtain 13 original color data. Each of the 13 original color data has 3 color space component values, that is, an R value, a G value, and a B value. That is, in the example of FIG. 1, the computing device 130 may obtain 13 R values, 13 G values, and 13 B values corresponding to 13 measurement positions, and take a minimum value from the 39 values as a target value. That is, the target value $T = \min_{i=1-13}(R_i, G_i, B_i)$, where i is the index value of the measurement position. In the present embodiment, the test color data measured by the color measurement devices 120_1-120_13 is desired to be approximate to the target value T, so that the projected image may achieve the purposes of uniform luminance and white balance.

At step S305, the computing device 130 adjusts the original test image by using uniformity compensation information to generate a test image. When a first correction program is executed, the uniformity compensation information corresponding to each pixel may be preset to 1. That is, the original test image in the first correction program will be the same as the test image. Then, when a first iterative correction program after the first correction program is executed, partial uniformity compensation information may be updated to a value less than 1 via the first correction program. The test image in the first iterative correction program is generated by the computing device 130 through adjusting the original test image according to the updated uniformity compensation information. Therefore, the test image in the first iterative correction program will be different from the original test image. By parity of reasoning, when a second iterative correction program after the first iterative correction program is executed, partial uniformity compensation information may be updated again via the first iterative correction program. The test image in the second iterative correction program is generated by the computing device 130 through adjusting the test image in the first iterative correction program according to the updated uniformity compensation information. Therefore, the test image in the second iterative correction program will be different from the original test image and the test image in the first iterative correction program. It is assumed that an original test image I is expressed as $(I^r_n, I^g_n, I^b_n)_{n=1-(M*N)}$ and uniformity compensation information is expressed as $(\beta^r_n, \beta^g_n, \beta^b_n)_{n=1-(M*N)}$, where n is a pixel index. A test image P may be expressed as $(P^r_n, P^g_n, P^b_n)_{n=1-(M*N)}$, where $P^r_n = I^r_n * \beta^r_n$, $P^g_n = I^g_n * \beta^g_n$, and $P^b_n = I^b_n * \beta^b_n$.

At step S306, the test image is projected onto the projection surface S1 by the projection device 110. Based on the foregoing, the projection device 110 may project different test images generated in multiple iterative correction programs onto the projection surface S1, and compute corresponding uniformity compensation information after each projection of the test image.

At step S307, when the test image is projected, the plurality of color measurement devices 120_1-120_13 is used to perform measurement on the projection surface S1 to acquire a plurality of test color data corresponding to a plurality of measurement positions respectively. The plurality of test color data is RGB color data. Similar to step S303, the computing device 130 converts, based on a color conversion matrix, a plurality of color measurement values measured by the plurality of color measurement devices 120_1-120_13 and corresponding to a first color space into the plurality of test color data corresponding to a second color space. When the test image is projected, the computing device 130 may convert color measurement values $(X_k, Y_k, Z_k)_{k=1-13}$ output by the color measurement devices 120_1-120_13 into test color data $(R_k, G_k, B_k)_{k=1-13}$, where k is an index value of a measurement position.

At step S308, the computing device 130 determines whether a difference between a maximum value and a minimum value among the plurality of color space components of the plurality of test color data is less than a tolerance threshold. The step is used to determine whether the iterative correction continues. In the present embodiment, the computing device 130 may determine whether to stop updating the uniformity compensation information according to a color measurement result. Specifically, in the example of FIG. 1, the computing device 130 may obtain a plurality of test color data corresponding to 13 measurement positions in step S307. The test color data includes 13 R values, 13 G values, and 13 B values. The computing device 130 takes minimum and maximum values from the 39 values and determines whether the difference between the maximum and minimum values is less than the tolerance threshold. The size of the tolerance threshold may be set according to an actual application situation.

On the contrary, if the difference is not less than the tolerance threshold ("No" in step S308), it is represented that the image uniformity of a current compensated projection result is unacceptable. That is, the current image uniformity is defined as non-uniform, and the computing device 130 determines to continue updating the uniformity compensation information. At step S309, the computing device 130 performs interpolation processing by using the plurality of measurement positions and the plurality of color space components of the test color data to obtain each piece of pixel information of an estimated image, so as to establish the estimated image. Specifically, the measurement positions may respectively correspond to different pixel coordinate positions, and the computing device 130 may perform interpolation processing according to the pixel coordinate positions and the corresponding test color data to obtain each piece of pixel information of the estimated image. The above interpolation processing may be thin-plate spline interpolation, other linear interpolation, or nonlinear interpolation. In more detail, the computing device 130 may sequentially perform interpolation processing for the respective spatial color components of the test color data and the corresponding measurement positions to sequentially acquire each pixel component value of each pixel of the estimated image. For example, it is assumed that an estimated image J is expressed as $(J^r_n, J^g_n, J^b_n)_{n=1-(M*N)}$. The computing device 130 may interpolate pixel component values $(J^r_n)_{n=1-(M*N)}$ of each pixel on the estimated image by using color space components $R_1$-$R_{13}$ in the test color data $(R_k, G_k, B_k)_{k=1-13}$ and the corresponding measurement positions. Similarly, the computing device 130 may interpolate pixel component values $(J^g_n)_{n=1-(M*N)}$ of each pixel on the estimated image by using color space components $G_1$-$G_{13}$ in the test color data $(R_k, G_k, B_k)_{k=1-13}$ and the corresponding measurement positions. Similarly, the computing device 130 may interpolate pixel component values $(J^b_n)_{n=1-(M*N)}$ of each pixel on the estimated image by using color space components $B_1$-$B_{13}$ in the test color data $(R_k, G_k, B_k)_{k=1-13}$ and the corresponding measurement positions.

At step S310, the computing device 130 generates adjustment coefficient information of each pixel according to a ratio of the target value to a pixel component value of each pixel in the estimated image and a convergence coefficient. Specifically, the computing device 130 may compare the target value T with each pixel in the estimated image J to determine the adjustment coefficient information of each pixel. It is to be noted that the adjustment coefficient information of each pixel also includes three adjustment coefficients corresponding to three color space components. Assuming that the adjustment coefficient information is expressed as $(\alpha^r_n, \alpha^g_n, \alpha^b_n)_{n=1-(M*N)}$, the computing device 130 may obtain the adjustment coefficient information according to the following formulas (1) to (3).

$$\alpha^r_n = (C+T)/(C+J^r_n) \quad \text{Formula (1)}$$

$$\alpha^g_n = (C+T)/(C+J^g_n) \quad \text{Formula (2)}$$

$$\alpha^b_n = (C+T)/(C+J^b_n) \quad \text{Formula (3)}$$

where n is the pixel index, C is the convergence coefficient, and T is the target value. However, the formulas (1) to (3) are only one implementation example, and the computing device 130 may compute the adjustment coefficient information according to other convergence formulas.

At step S311, the computing device 130 updates the uniformity compensation information according to the adjustment coefficient information. The computing device 130 may multiply the adjustment coefficient information by the uniformity compensation information to update the uniformity compensation information. Assuming that the uniformity compensation information is expressed as $(\beta^r_n, \beta^g_n, \beta^b_n)_{n=1-(M*N)}$ and the adjustment coefficient information is expressed as $(\alpha^r_n, \alpha^g_n, \alpha^b_n)_{n=1-(M*N)}$, the updated uniformity compensation information is $(\beta^r_n*\alpha^r_n, \beta^g_n*\alpha^g_n, \beta^b_n*\alpha^b_n)_{n=1-(M*N)}$.

After step S311, the process returns to step S305, and the original test image is adjusted again by using the updated uniformity compensation information to generate the test image to execute the next iterative correction program. In other words, steps S305 to S311 will be repeatedly performed by the computing device 130 until the test image in a certain iterative correction program satisfies the condition of step S308. It is to be noted that when steps S305 to S311 are repeatedly performed, the test color data measured by the color measurement devices 120_1-120_13 will gradually converge to the target value, and the uniformity compensation information will gradually converge.

Further, after step S307, if the difference between the maximum value and the minimum value among the plurality of color space components of the plurality of test color data is less than the tolerance threshold ("Yes" in step S308), it is represented that the image uniformity of the current compensated projection result is acceptable, and the computing device 130 determines to terminate updating the uniformity compensation information. At step S312, the computing device 130 provides the uniformity compensation information to the projection device 110, such that the projection device 110 may store the uniformity compensation information in a processing circuit such as a DSP or other storage components. Therefore, the projection device 110 may adjust the initial image provided by an image source device according to the uniformity compensation information in the processing circuit in the future, thereby improving the projection quality.

Figure 4:
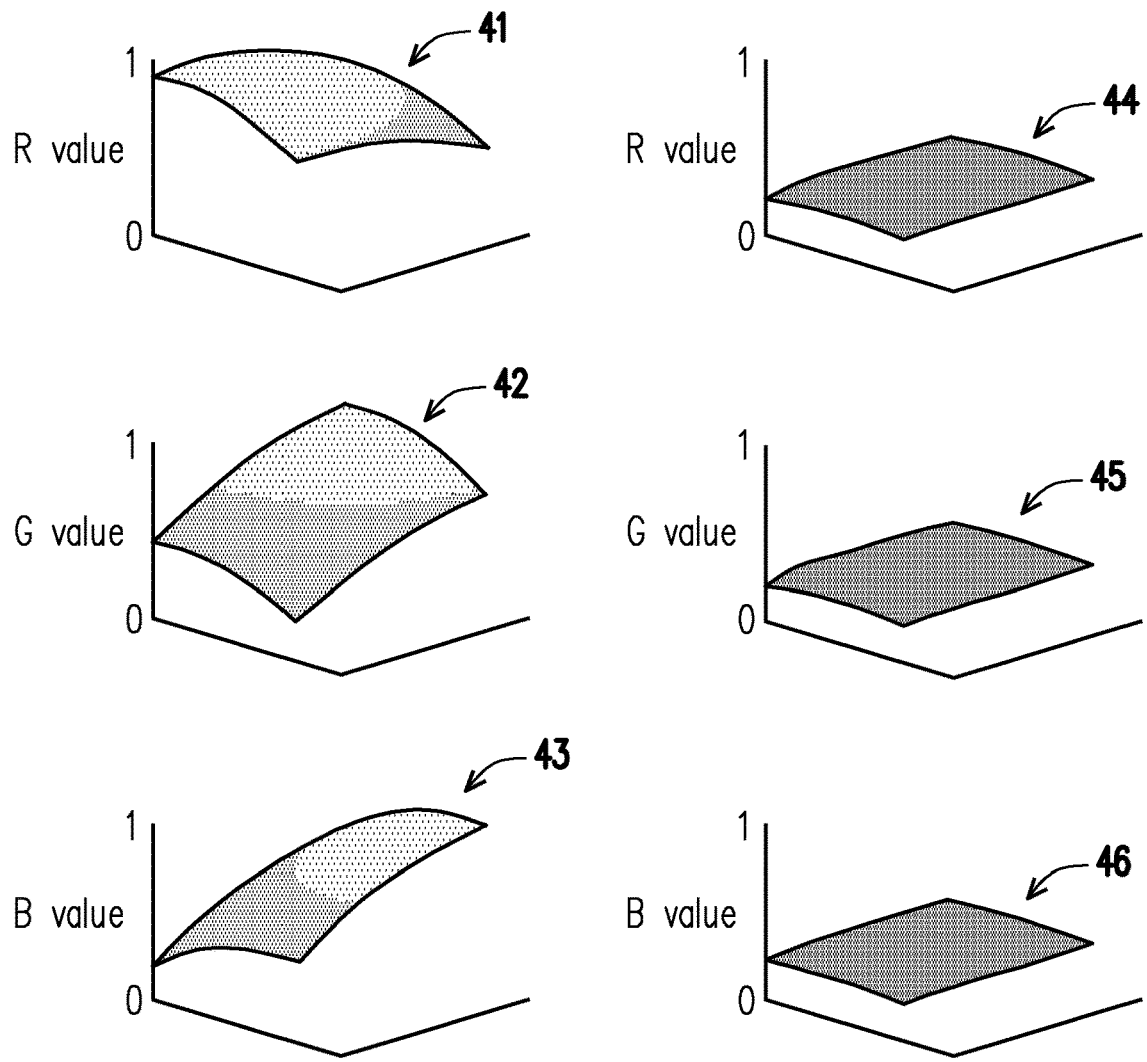
FIG. 4 is a schematic diagram of distribution of color space components of a projected picture before and after correction according to an embodiment of the present disclosure.

FIG. 4 is a schematic diagram of distribution of color space components of a projected image before and after correction according to an embodiment of the present disclosure. Referring to FIG. 4, when the uniformity compensation information of the embodiments of the present disclosure is not applied to uniformity correction, even if the projection device 110 receives a white image having the same pixel value, an R value distribution 41, a G value distribution 42 and a B value distribution 43 of a projected image actually projected onto a projection surface are non-uniform. Moreover, the non-uniform R value distribution 41, G value distribution 42 and B value distribution 43 not only cause a phenomenon of inconsistent image luminance, but also cause a phenomenon that an actual projected image appears to be non-uniform in chrominance. After the uniformity compensation information of the embodiments of the present disclosure is applied to uniformity correction, an R value distribution 44, a G value distribution 45 and a B value distribution 46 of the actual projected image are uniform. Therefore, the actual projected image may be in a state of uniform luminance and uniform chrominance. It can be seen that the embodiments of the present disclosure achieve the purpose of uniformizing the entire projected image by compressing a image contrast.

However, since the luminance actually presented on the projected image does not necessarily have a linear relationship with the luminance of an input image, the computing device 130 may also repeat the flow shown in FIG. 3 according to different test luminances (e.g., five test luminances of 100%, 75%, 50%, 25% or 0%) to generate a plurality of sets of sub-uniformity compensation information corresponding to a plurality of test luminances. After generating the corresponding sub-uniformity compensation information for different test luminances, the computing device 130 may interpolate the plurality of sets of sub-uniformity compensation information to generate sub-uniformity compensation information corresponding to other luminances for processing images of different luminances.

Figure 5:
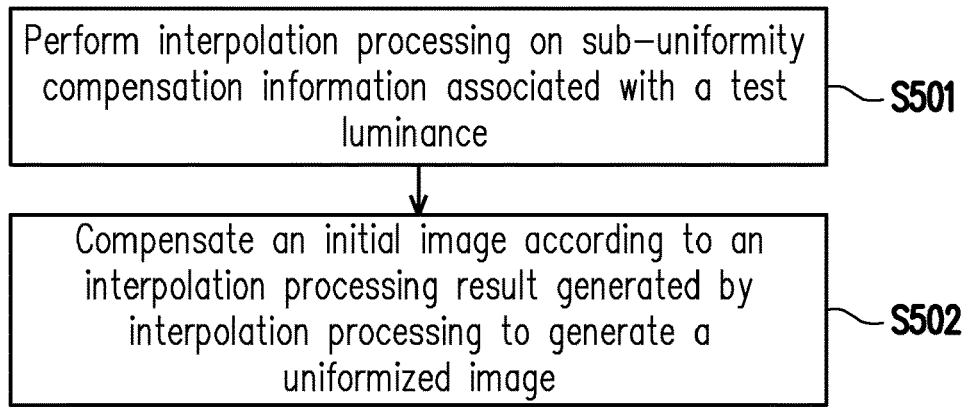
FIG. 5 is a flow chart of performing uniformity compensation based on a plurality of sets of sub-uniformity compensation information according to an embodiment of the present disclosure.

FIG. 5 is a flow chart of performing uniformity compensation based on a plurality of sets of sub-uniformity compensation information according to an embodiment of the present disclosure. The method flow of FIG. 5 may be implemented by various components of the projection system 10 of FIG. 1. Referring to FIG. 1 and FIG. 5 simultaneously, the description will be performed below with reference to the various components of the projection system 10 in FIG. 1.

At step S501, the computing device 130 interpolates sub-uniformity compensation information associated with a test luminance. At step S502, the projection device 110 compensates an initial image according to an interpolation processing result generated by interpolation processing to generate a uniformized image. In other words, in an embodiment, the uniformity compensation information may include a plurality of sub-uniformity compensation information associated with a plurality of test luminances. The computing device 130 may derive sub-uniformity compensation information associated with other luminances according to the plurality of sub-uniformity compensation information generated after actually executing an iterative correction program. Therefore, the projection device 110 may adjust an initial image according to the sub-uniformity compensation information corresponding to different luminances to generate a uniformized image. For example, when a grayscale value (i.e., luminance) of one pixel in the initial image is L1, the projection device 110 may query the sub-uniformity compensation information corresponding to the luminance L1 to acquire a uniformity compensation gain value of the pixel. When a grayscale value of another pixel in the initial image is L2, the projection device 110 may query the sub-uniformity compensation information corresponding to the luminance L2 to acquire a uniformity compensation gain value of the another pixel.

Figure 6A:
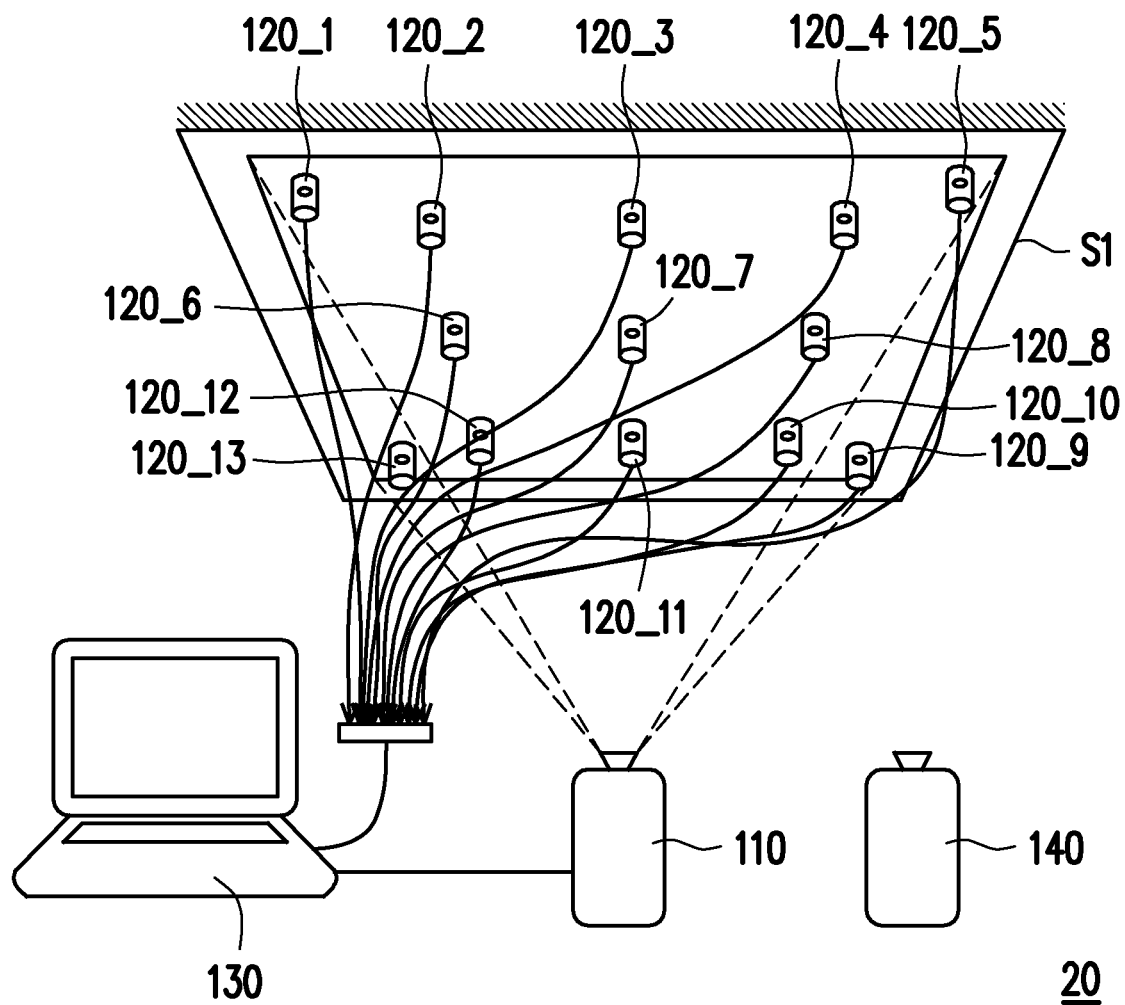
FIG. 6A and FIG. 6B are schematic diagrams of a projection system according to an embodiment of the present disclosure.
Figure 6B:
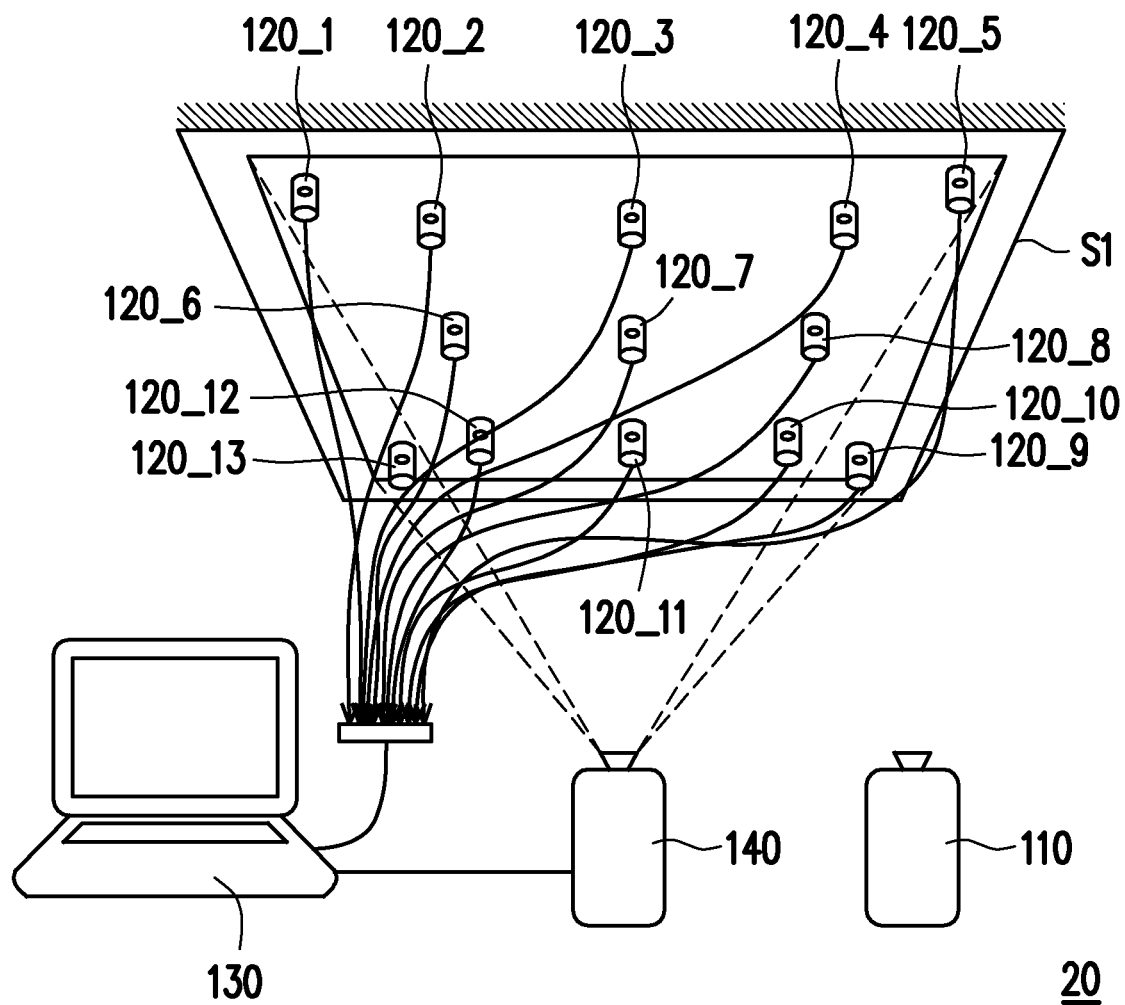

In addition, the embodiments of the present disclosure may also perform uniformity correction on a plurality of projection devices. FIG. 6A and FIG. 6B are schematic diagrams of a projection system according to an embodiment of the present disclosure. Referring to FIG. 6A and FIG. 6B, a projection system 20 includes a projection device 110, a plurality of color measurement devices 120_1-120_13, a computing device 130, and a projection device 140. The projection device 110, the plurality of color measurement devices 120_1-120_13, and the computing device 130 of FIG. 6A and FIG. 6B are similar to those of FIG. 1, and the descriptions thereof are omitted herein. It is to be noted that the projection system 20 further includes a projection device 140. The projection device 140 and the projection device 110 may cause a projected image generated by the two devices to have a chrominance drop or a luminance drop due to various factors. That is, even if the projection device 140 and the projection device 110 receive the same pixel information, the projected images generated by the two devices have a color drop to human eyes.

In an embodiment, the computing device 130 may generate corresponding uniformity compensation information for the projection device 140 and the projection device 110, respectively. The projection device 140 and the projection device 110 may adjust input images according to the respective uniformity compensation information, so that the chrominance and luminance of the projected images of the two devices are consistent to facilitate application of the two projection devices to splicing the projected images.

Referring first to FIG. 6A, the projection device 110 projects an original test image corresponding to a test luminance onto a projection surface S1. When the projection device 110 is used to project the original test image, the plurality of color measurement devices 120_1-120_13 is used to perform measurement on the projection surface S1 to acquire a plurality of first original color data corresponding to a plurality of measurement positions respectively. Referring again to FIG. 6B, the projection device 110 is then replaced with the projection device 140, and the original test image corresponding to the test luminance is projected onto the projection surface S1 by another projection device 140 further included in the projection system 20. When the another projection device 140 is used to project the original test image, the plurality of color measurement devices 120_1-120_13 is used to perform measurement on the projection surface S1 to acquire a plurality of second original color data corresponding to a plurality of measurement positions respectively.

Based on the above, after the plurality of first original color data and the plurality of second original color materials are respectively obtained from the projection device 110 and the projection device 140. the computing device 130 may acquire a target value by taking a minimum value from a plurality of color space component values of the plurality of first original color data and a plurality of color space component values of the plurality of second original color data. Specifically, for the projection device 110, the computing device 130 may obtain 13 R values, 13 G values, and 13 B values corresponding to 13 measurement positions. For the projection device 140, the computing device 130 may obtain 13 R values, 13 G values, and 13 B values corresponding to 13 measurement positions as well. Then, the computing device 130 finds a minimum value among the 78 values as a target value of the projection device 110 and the projection device 140.

Thereafter, the computing device 130 and the projection device 110 may execute an iterative correction program (e.g., steps S305 to S312 of FIG. 3) according to the target value to obtain the uniformity compensation information of the projection device 110. Then, the computing device 130 and the projection device 140 may execute an iterative correction program (e.g., steps S305 to S312 of FIG. 3) according to the target value to obtain the uniformity compensation information of the projection device 140. Therefore, the projection device 140 and the projection device 110 may adjust input images according to the respective uniformity compensation information, so that the chrominance and luminance of the projected images of the two devices are consistent. In other embodiments, the projection system may include a plurality of projection devices, not limited to two projection devices.

Based on the above, the embodiments of the present disclosure may determine a compensation gain value for each color space component by actually measuring real image color information on a projection surface. Therefore, regardless of the cause of non-uniform luminance or chrominance of the projection image, after the projection device adjusts an input image by using the uniformity compensation information of the embodiments of the present disclosure, the phenomenon of non-uniform luminance and/or non-uniform chrominance of the projected image generated by the projection device can be improved, thereby improving the projection quality. Furthermore, the embodiments of the present disclosure may also generate corresponding uniformity compensation information for a curved projection surface, so that the projected image does not cause a phenomenon of non-uniform luminance due to the fact that the projection surface is the curved projection surface.

In addition, since the color measurement device directly performs measurement on the projection surface in the embodiments of the present disclosure, compared with correction by capturing the projected image via a camera, the embodiments of the present disclosure can ignore the influences of the correction of the camera and the own errors of the camera. In other words, compared with correction using information captured by the camera, test color data captured in the embodiments of the present disclosure is closer to an actual situation and can more accurately compensate for the non-uniform luminance of an image, thereby further improving the display quality of the projection device.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. An image uniformity compensation method for a projection system, the projection system comprising a projection device, the method comprising:
   projecting, by the projection device, a test image onto a projection surface;
   when the test image is projected, performing, by a plurality of color measurement devices, measurement on the projection surface to acquire a plurality of test color data corresponding to a plurality of measurement positions respectively;
   establishing an estimated image by using the plurality of test color data;
   updating uniformity compensation information of each pixel according to a target value and each piece of pixel information of the estimated image, wherein the uniformity compensation information of each pixel is a compensation gain value, and the compensation gain value is between 0 and 1; and
   compensating an initial image according to the uniformity compensation information to generate a uniformized image, and projecting, by the projection device, the uniformized image.

2. An image uniformity compensation method for a projection system, the projection system comprising a projection device, the method comprising:
   projecting, by the projection device, a test image onto a projection surface;
   when the test image is projected, performing, by a plurality of color measurement devices, measurement on the projection surface to acquire a plurality of test color data corresponding to a plurality of measurement positions respectively;
   establishing an estimated image by using the plurality of test color data;
   updating uniformity compensation information of each pixel according to a target value and each piece of pixel information of the estimated image; and
   compensating an initial image according to the uniformity compensation information to generate a uniformized image, and projecting, by the projection device, the uniformized image,
   wherein the method further comprises:
   projecting, by the projection device, an original test image corresponding to a test luminance onto the projection surface;
   when the original test image is projected, performing, by the plurality of color measurement devices, measurement on the projection surface to acquire a plurality of original color data corresponding to the plurality of measurement positions; and
   acquiring the target value by taking a minimum value from a plurality of color space component values of the plurality of original color data.

3. The image uniformity compensation method according to claim 2, wherein the step of updating the uniformity compensation information of each pixel according to the target value and each piece of pixel information of the estimated image comprises:
   generating adjustment coefficient information of each pixel according to a ratio of the target value to a pixel component value of each pixel in the estimated image and a convergence coefficient; and
   updating the uniformity compensation information according to the adjustment coefficient information.

4. An image uniformity compensation method for a projection system, the projection system comprising a projection device, the method comprising:
   projecting, by the projection device, a test image onto a projection surface;
   when the test image is projected, performing, by a plurality of color measurement devices, measurement on the projection surface to acquire a plurality of test color data corresponding to a plurality of measurement positions respectively;
   establishing an estimated image by using the plurality of test color data;
   updating uniformity compensation information of each pixel according to a target value and each piece of pixel information of the estimated image; and
   compensating an initial image according to the uniformity compensation information to generate a uniformized image, and projecting, by the projection device, the uniformized image,
   wherein before the step of projecting, by the projection device, the test image onto the projection surface, the method further comprises:
   obtaining an original test image corresponding to a test luminance; and
   adjusting the original test image by using the uniformity compensation information to generate the test image.

5. An image uniformity compensation method for a projection system, the projection system comprising a projection device, the method comprising:
   projecting, by the projection device, a test image onto a projection surface;
   when the test image is projected, performing, by a plurality of color measurement devices, measurement on the projection surface to acquire a plurality of test color data corresponding to a plurality of measurement positions respectively;
   establishing an estimated image by using the plurality of test color data;
   updating uniformity compensation information of each pixel according to a target value and each piece of pixel information of the estimated image; and
   compensating an initial image according to the uniformity compensation information to generate a uniformized image, and projecting, by the projection device, the uniformized image,
   wherein before the step of establishing the estimated image by using the plurality of test color data, the method further comprises:
   determining whether a difference between a maximum value and a minimum value among a plurality of color space components of the plurality of test color data is less than a tolerance threshold;
   if the difference is less than the tolerance threshold, determining to terminate updating the uniformity compensation information; and
   if the difference is not less than the tolerance threshold, determining to continue updating the uniformity compensation information.

6. An image uniformity compensation method for a projection system, the projection system comprising a projection device, the method comprising:
   projecting, by the projection device, a test image onto a projection surface;
   when the test image is projected, performing, by a plurality of color measurement devices, measurement on the projection surface to acquire a plurality of test color data corresponding to a plurality of measurement positions respectively;
   establishing an estimated image by using the plurality of test color data;
   updating uniformity compensation information of each pixel according to a target value and each piece of pixel information of the estimated image; and
   compensating an initial image according to the uniformity compensation information to generate a uniformized image, and projecting, by the projection device, the uniformized image,
   wherein the step of establishing the estimated image by using the plurality of test color data comprises:
   performing interpolation processing by using the plurality of measurement positions and a plurality of color space components of the test color data to obtain each piece of pixel information of the estimated image, so as to establish the estimated image.

7. The image uniformity compensation method according to claim 1, wherein the step of performing, by the plurality of color measurement devices, measurement on the projection surface to acquire the plurality of test color data corresponding to the plurality of measurement positions respectively when the test image is projected comprises:
   converting, based on a color conversion matrix, a plurality of color measurement values measured by the plurality of color measurement devices and corresponding to a first color space into the plurality of test color data corresponding to a second color space.

8. The image uniformity compensation method according to claim 1, wherein the plurality of test color data are RGB color data.

9. An image uniformity compensation method for a projection system, the projection system comprising a projection device, the method comprising:
   projecting, by the projection device, a test image onto a projection surface;
   when the test image is projected, performing, by a plurality of color measurement devices, measurement on the projection surface to acquire a plurality of test color data corresponding to a plurality of measurement positions respectively;
   establishing an estimated image by using the plurality of test color data;
   updating uniformity compensation information of each pixel according to a target value and each piece of pixel information of the estimated image; and
   compensating an initial image according to the uniformity compensation information to generate a uniformized image, and projecting, by the projection device, the uniformized image,
   wherein the uniformity compensation information comprises a plurality of sub-uniformity compensation information associated with a plurality of test luminances, and the step of compensating the initial image according to the uniformity compensation information to generate the uniformized image comprises:
   performing interpolation processing on the sub-uniformity compensation information associated with the test luminance; and
   compensating the initial image according to an interpolation processing result generated by interpolation processing to generate the uniformized image.

10. An image uniformity compensation method for a projection system, the projection system comprising a projection device, the method comprising:

projecting, by the projection device, a test image onto a projection surface;

when the test image is projected, performing, by a plurality of color measurement devices, measurement on the projection surface to acquire a plurality of test color data corresponding to a plurality of measurement positions respectively;

establishing an estimated image by using the plurality of test color data;

updating uniformity compensation information of each pixel according to a target value and each piece of pixel information of the estimated image; and compensating an initial image according to the uniformity compensation information to generate a uniformized image, and projecting, by the projection device, the uniformized image, wherein the method further comprises:

projecting, by the projection device, an original test image corresponding to a test luminance onto the projection surface;

when the original test image is projected by the projection device, performing, by the plurality of color measurement devices, measurement on the projection surface to acquire a plurality of first original color data corresponding to the plurality of measurement positions;

projecting, by another projection device further comprised by the projection system, the original test image corresponding to the test luminance onto the projection surface;

when the original test image is projected by the another projection device, performing, by the plurality of color measurement devices, measurement on the projection surface to acquire a plurality of second original color data corresponding to the plurality of measurement positions; and acquiring the target value by taking a minimum value from a plurality of color space component values of the plurality of first original color data and a plurality of color space component values of the plurality of second original color data.

11. A projection system, comprising a projection device, a plurality of color measurement devices, and a computing device, wherein the projection device projects a test image onto a projection surface;

the plurality of color measurement devices is provided on the projection surface; and the computing device connects the projection device and the plurality of color measurement devices;

when the projection device projects the test image, the plurality of color measurement devices performs measurement on the projection surface, and the computing device acquires a plurality of test color data corresponding to a plurality of measurement positions respectively;

the computing device establishes an estimated image by using the plurality of test color data, and updates uniformity compensation information of each pixel according to a target value and each piece of pixel information of the estimated image, wherein the uniformity compensation information of each pixel is a compensation gain value, and the compensation gain value is between 0 and 1;

the computing device compensates an initial image according to the uniformity compensation information to generate a uniformized image, which is then projected by the projection device.

12. The projection system according to claim 11, wherein the projection device projects an original test image corresponding to a test luminance onto the projection surface;

when the projection device projects the original test image, the plurality of color measurement devices performs measurement on the projection surface, and the computing device acquires a plurality of original color data corresponding to the plurality of measurement positions from the plurality of color measurement devices; and the computing device acquires the target value by taking a minimum value from a plurality of color space component values of the plurality of original color data.

13. The projection system according to claim 12, wherein the computing device generates adjustment coefficient information of each pixel according to a ratio of the target value to a pixel component value of each pixel in the estimated image, and updates the uniformity compensation information according to the adjustment coefficient information.

14. The projection system according to claim 11, wherein before the projection device projects the test image onto the projection surface, the computing device obtains an original test image corresponding to a test luminance, and adjusts the original test image by using the uniformity compensation information to generate the test image.

15. The projection system according to claim 11, wherein before the computing device establishes the estimated image by using the plurality of test color data, the computing device further determines whether a difference between a maximum value and a minimum value among a plurality of color space components of the plurality of test color data is less than a tolerance threshold; and if the difference is less than the tolerance threshold, the computing device determines to terminate updating the uniformity compensation information, and if the difference is not less than the tolerance threshold, the computing device determines to continue updating the uniformity compensation information.

16. The projection system according to claim 11, wherein the computing device performs interpolation processing by using the plurality of measurement positions and a plurality of color space components of the test color data to obtain each piece of pixel information of the estimated image, so as to establish the estimated image.

17. The projection system according to claim 11, wherein the computing device converts, based on a color conversion matrix, a plurality of color measurement values measured by the plurality of color measurement devices and corresponding to a first color space into the plurality of test color data corresponding to a second color space.

18. The projection system according to claim 11, wherein the plurality of test color data are RGB color data.

19. The projection system according to claim 11, wherein the uniformity compensation information comprises a plurality of sub-uniformity compensation information associated with a plurality of test luminances, and the computing device performs interpolation processing on the sub-uniformity compensation information associated with the test luminance and compensates the initial image according to an interpolation processing result generated by interpolation processing to generate the uniformized image.

20. The projection system according to claim 11, further comprising another projection device, wherein when the projection device projects an original test image corresponding to a test luminance onto the projection surface, the plurality of color measurement devices performs measurement on the projection surface, and the computing device acquires a plurality of first original color data corresponding to the plurality of measurement positions;

when the another projection device projects the original test image corresponding to the test luminance onto the projection surface, the plurality of color measurement devices performs measurement on the projection surface, and the computing device acquires a plurality of second original color data corresponding to the plurality of measurement positions; and the computing device acquires the target value by taking a minimum value from a plurality of color space component values of the plurality of first original color data and a plurality of color space component values of the plurality of second original color data.

* * * * *